LEAD-FORMING FIXTURE

Filed July 2, 1962

INVENTOR.
R. E. HOTZE
BY
S. Gundersen
ATTORNEY 3,131,745

LEAD-FORMING FIXTURE

Robert E. Hotze, Westerville, Ohio, assignor to Western Electric Company, Incorporated, New York, N.Y., a corporation of New York Filed July 2, 1962, Ser. No. 206,564
3 Claims. (Cl. 153—2)

This invention relates to a lead-forming fixture and has a primary object of forming the leads of an electrical component in a desired configuration in a single operation.

Another object of this invention is to provide a fixture which clamps axial leads adjacent to a component and applies increasing pressure upon the clamped leads during subsequent forming of the leads to lessen the increased tension upon the portion of the leads adjacent to the component resulting from the forming operation.

With these and other objects in view, the present invention contemplates a fixture having a pivotal arm which is provided with cantilevered springs extending from the pivot point towards a nest for receiving a component having leads extending axially therefrom. The nest is provided with an anvil which cooperates with the cantilevered springs for clamping and subsequently forming the leads thereabout as the arm is pivoted into engagement with the component leads.

Other objects and advantages of the present invention will be apparent from the following detailed description when considered in accordance with the accompanying drawing, wherein.

Figure 1:
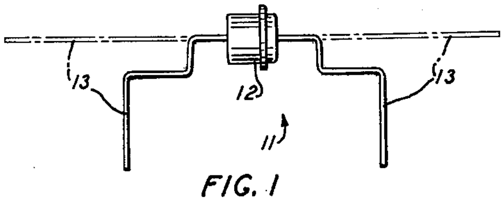
FIG. 1 is a view showing a component having normally axially extending leads in phantom lines which are subsequently formed, as shown in solid lines.
Figure 2:
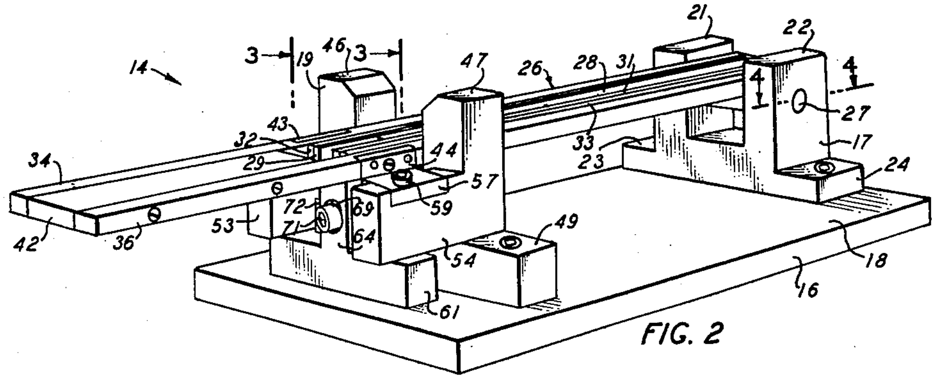
FIG. 2 is a perspective view of a fixture for forming the axial leads of a component, as shown in FIG. 1.
Figure 4:
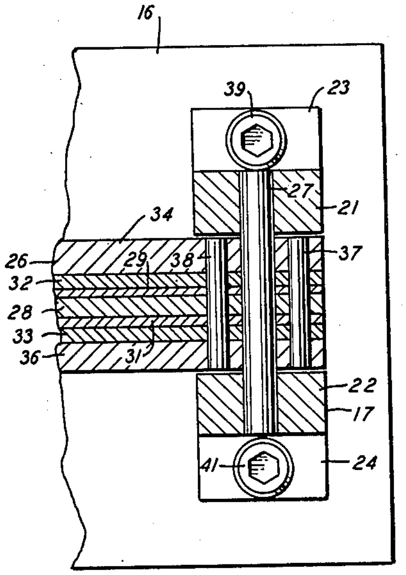
FIG. 4 is a sectional view taken along line 4—4 of FIG. 2 showing the mounting features of the forming element.

Referring to FIG. 1, an electrical component 11 having a central body 12 is provided with axially extending leads 13 as shown in phantom lines. The leads 13 are subsequently formed as shown in solid lines. A fixture, generally designated by the reference numeral 14, as shown in FIG. 2, is provided with a base 16 for supporting a bifurcated support 17 on one end of a surface 18 thereof and a second bifurcated support 19 at the opposite end on the surface 18. The support 17 is provided with a pair of vertical extensions 21 and 22 and a pair of base extensions 23 and 24. An arm 26 is pivotally mounted between the vertical extensions 21 and 22 by means of a pin 27 which extends through the extensions and the arm. The arm 26 is a fabricated arrangement having a central spacer 28 sandwiched between a pair of leaf springs 29 and 31. A second pair of leaf springs 32 and 33 are positioned adjacent the first pair of leaf springs and a pair of rigid forming elements 34 and 36 are position adjacent to the pair of leaf springs 32 and 33 to complete the fabrication as shown in FIG. 4. A pair of pins 37 and 38 are inserted transversely within the elements of fabrication to retain the elements in an orderly arrangement.

Figure 3:
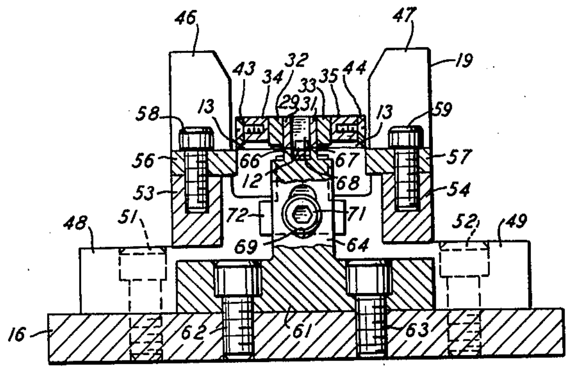
FIG. 3 is a sectional view taken along lines 3—3 of FIG. 2 showing the relationship between a nest for receiving the component and a forming member for forming the axial leads, as shown in FIG. 1.

As previously discussed, the fabricated arm 26 is pivotally mounted between the vertical extensions 21 and 22 of the support 17 by use of the pin 27. It is to be noted that the support 17 is rigidly fastened to the base 16 by means of fastening members 39 and 41. In addition, the leaf springs 29, 31, 32 and 33 are arranged in a cantilevered fashion and extend towards the support 19. A spacer 42 is positioned between the free ends of the forming elements 34 and 36 to provide a rigid clamping surface for pivotal movement of the arm 26. In addition, as shown in FIGS. 2 and 3, a pair of cutting elements 43 and 44 are fixedly mounted on the outer edges of the forming elements 34 and 36, respectievly.

The support 19 is provided with a pair of vertical extensions 46 and 47 and a pair of base extensions 48 and 49 and is rigidly fastened to the base 16 by means of fastening members 51 and 52. In addition, the support 19 is formed with a pair of horizontal extensions 53 and 54, each of which provide a nest for the reception of cutting blocks 56 and 57 which are fastened thereto by members 58 and 59.

A component support 61 is fastened to the base 16 by fastening members 62 and 63 and is provided with a vertical extension or anvil 64 which is positioned between the horizontal extensions 53 and 54 of the support 19. The anvil 64 is provided with a pair of spaced vertical ledges 66 and 67 thereby providing a nest 68 therebetween. In addition, the anvil 64 is formed with a slot 69 for receiving a fastening member 71 which is fastened to a stepped stop block 72 on the opposite side of the anvil 64. The stop block 72 is provided with surfaces for engaging and stopping the forming springs 32 and 33 and the forming elements 34 and 36. The stop block 72 is adjustable by loosensing the fastening member 71 and moving the member within the slot 69 and thereafter fastening the member 71 so that the block 72 is rigidly positioned relative to the anvil 64.

In the operation of the fixture 14, the component 11 is positioned so that the body 12 rests in the nest 68 and the axially extended leads 13 are positioned over the ledges 66 and 67 of the anvil 64 and rest on the upper surfaces of the cutting blocks 56 and 57. The arm 26 is pivoted so that the cantilevered springs 29 and 31 engage and clamp the axially extended leads 13 between the springs and the ledges 66 and 67 of the anvil 64. As the arm 26 is further pivoted, the cutting members 43 and 44 engage the extended leads 13 to sever the leads in cooperation with the cutting blocks 56 and 57. In view of the cantilevered arrangement of the springs 29 and 31, continued downward movement of the arm 26 provides a continuous and increasing positive gripping or clamping action upon the portion of the leads 13 adjacent to the body 12 of the component 11. Subsequently, the cantilevered springs 32 and 33 engage the leads 13 adjacent to the gripped portion of the leads and form a step in the leads 13 in cooperation with the anvil 64. Thereafter, the cantilevered springs 32 and 33 are prevented from further movement by engagement with the stop block 72. Upon continued downward movement of the arm 26, the forming elements 34 and 36 engage the extended portions of the leads 13 and form these portions along the vertical edges of the anvil 64.

It is to be particularly noted that the forming action is accomplished with a single pivotal movement of the arm 26 due to the cantilevered arrangement of the springs 29, 31, 32 and 33. By utilizing the fixture 14, a multiple step operation involving a plurality of clamping and forming elements to accomplish the forming is overcome.

It is to be understood that the above-described arrangements are illustrative to the principles of the invention. Numerous other arrangements may be devised by those skilled in the art without departing from the spirit and scope of the invention.

What is claimed is:

1. A fixture for forming the leads of a component, which comprises:

means for supporting the component and the leads for subsequent forming, means for forming the leads about the support means, and means mounted in a cantilevered fashion on the forming means for clamping the leads adjacent to the component against the support means and for continuously increasing the clamping pressure during the forming of the leads to lessen the effects of the tension on the leads resulting from the forming thereof.

2. A fixture for forming axially extended leads of components, which comprises:

an anvil formed with a pair of spaced ledges, a nest formed in the anvil between the ledges for receiving the component so that the leads adjacent to the component rest on the ledges, a first pair of pivotally mounted cantilevered springs mounted on the fixture with the free ends of the springs engaging and clamping the leads against the ledges as the springs are pivoted and apply a continuously increasing pressure upon the clamped leads during the subsequent forming of the leads to lessen the effects of the tension on the leads resulting from the forming, and a second pair of pivotally mounted cantilevered springs mounted on the fixture with the free ends of the second pair of springs engaging the unclamped portions of the leads and forming the leads about the anvil as the springs are pivoted.

3. A fixture for forming the leads of components, which comprises:

means for supporting the component and the leads adjacent to the component, means for supporting the free ends of the extended leads, and means pivotally mounted on the fixture for applying a continuously increasing clamp pressure upon the leads adjacent to the component during a subsequent forming of the leads and for cooperating with the extended lead supporting means to sever the leads and subsequently form the remaining portion of the leads about the component support means.

References Cited in the file of this patent

UNITED STATES PATENTS

| | | |
|---|---|---|
| 1,914,966 | Weisbender | June 20, 1953 |
| 3,063,473 | Hawkey | Nov. 13, 1962 |

FOREIGN PATENTS

| | | |
|---|---|---|
| 3,152 | Great Britain | Jan. 14, 1904 |